United States Patent [19]

Sens et al.

[11] Patent Number: 5,512,095
[45] Date of Patent: Apr. 30, 1996

[54] NAPHTHALOCYANINES

[75] Inventors: Benno Sens, Netphen; Andres C. G. Espino; Bernhard Albert, both of Maxdorf; Juergen Kipper, Karlsruhe, all of Germany

[73] Assignee: BASF Aktiengesellschaft, Ludwigshafen, Germany

[21] Appl. No.: 255,988

[22] Filed: Jun. 8, 1994

[30] Foreign Application Priority Data

Jun. 8, 1993 [DE] Germany .................... 43 18 983.0

[51] Int. Cl.⁶ ................................................ C09B 67/50
[52] U.S. Cl. ...................... 106/412; 106/410; 106/411; 540/141
[58] Field of Search ....................... 106/410, 411, 106/412; 540/141

[56] References Cited

U.S. PATENT DOCUMENTS

| | | | |
|---|---|---|---|
| 2,857,400 | 10/1958 | Cooper, II | 544/75 |
| 3,523,030 | 8/1970 | Malin et al. | 106/410 |
| 5,250,207 | 10/1993 | Kormann et al. | 252/62.54 |
| 5,282,894 | 2/1994 | Albert et al. | 106/22 D |

FOREIGN PATENT DOCUMENTS

| | | |
|---|---|---|
| 0269079 | 6/1988 | European Pat. Off. . |
| 0384470 | 8/1990 | European Pat. Off. . |
| 0401782 | 12/1990 | European Pat. Off. . |
| 0553614 | 8/1993 | European Pat. Off. . |
| 0574790 | 12/1993 | European Pat. Off. . |
| 4202038 | 7/1993 | Germany . |
| 2168372 | 6/1986 | United Kingdom . |

OTHER PUBLICATIONS

Ullman's Encyclopedia of Industrial Chemistry, 5th ed., vol. A20, p. 225, ed. B. Elvers, VCH, Weinheim, 1992. No Month.

*Primary Examiner*—Mark L. Bell
*Assistant Examiner*—Scott Hertzog
*Attorney, Agent, or Firm*—Oblon, Spivak, McClelland, Maier & Neustadt

[57] ABSTRACT

Naphthalocyanines of the general formula I

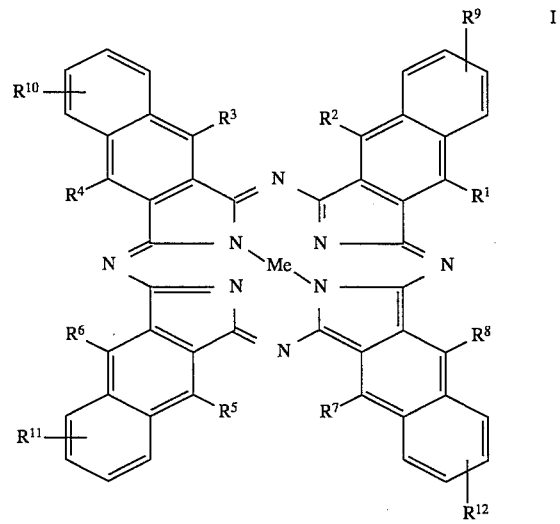

where the variables have the following meanings:

$R^1$, $R^2$, $R^3$, $R^4$, $R^5$, $R^6$, $R^7$ and $R^8$ are each independently of the others hydrogen, hydroxyl or $C_1$-$C_{20}$-alkyl or $C_1$-$C_{20}$-alkoxy, whose carbon chains may each be interrupted by from 1 to 4 oxygen atoms in ether function and which may be phenyl-substituted, $R^9$, $R^{10}$, $R^{11}$ and $R^{12}$ are each independently of the others hydrogen, halogen or $C_1$-$C_{20}$-alkyl or $C_1$-$C_{20}$-alkoxy, whose carbon chains may each be interrupted by from 1 to 4 oxygen atoms in ether function, Me is two hydrogen atoms, two univalent metal atoms or a bivalent metal atom with or without further substituents for valence saturation, are pigments with isometric particles and a particle size distribution from 10 to 300 nm.

10 Claims, No Drawings

NAPHTHALOCYANINES

The present invention relates to novel naphthalocyanines of the general formula I

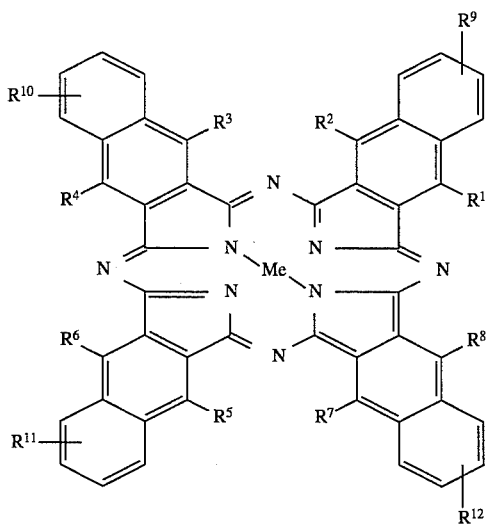

where the variables have the following meanings:
$R^1$, $R^2$, $R^3$, $R^4$, $R^5$, $R^6$, $R^7$ and $R^8$ are each independently of the others hydrogen, hydroxyl or $C_1$-$C_{20}$-alkyl or $C_1$-$C_{20}$-alkoxy, whose carbon chains may each be interrupted by from 1 to 4 oxygen atoms in ether function and which may be phenyl-substituted, $R^9$, $R^{10}$, $R^{11}$ and $R^{12}$ are each independently of the others hydrogen, halogen or $C_1$-$C_{20}$-alkyl or $C_1$-$C_{20}$-alkoxy, whose carbon chains may each be interrupted by from 1 to 4 oxygen atoms in ether function, Me is two hydrogen atoms, two univalent metal atoms or a bivalent metal atom with or without further substituents for valence saturation, as pigments with isometric particles and a particle size distribution from 10 to 300 nm.

The invention also relates to the preparation of these naphthalocyanines, to their use for pigmenting printing inks, paints and plastics and to printing inks containing these naphthalocyanines as pigments.

Modern communications technology depends increasingly on the safe and rapid input of information. Of particular importance is the automatic, digital reading of information in printed, digital or analog form. An example are printed bar codes which can be sensed and read with suitable light sources and detectors.

Of particular interest in this context are colorants which absorb in the infrared region and have little or no absorption in the visible region. These colorants can be used not only for the printing of packages in general but in particular for the printing of valuable documents, which for the purposes of the present invention covers the sector of securities, share certificates, security prints of any kind and in addition identity cards, rail and air tickets, lottery tickets, and security features on labels and entitlement certificates of any kind.

The colorants used for these purposes have to meet a number of different requirements depending on the use. Essential are in general high lightfastness, narrowband IR absorption, and good transparency in the visible region.

If the colorants used are dyes which are present in the application medium in a dissolved state, their poor fastness properties, such as insufficient solvent and migration fastness, but also insufficient lightfastness, frequently present problems.

Not even the naphthalocyanine dyes known from GB-A-2 168 372 and DE-A-4 202 038, an earlier patent document which was unpublished at the priority date of the present invention, are completely satisfactory in this respect.

Application in the form of an undissolved pigment, which usually has better lightfastness, is difficult because the colorants usually have a particle geometry which is inadequate for the printing ink and paint sector.

It is an object of the present invention to provide colorants which meet the stated requirements and which have altogether good application properties.

We have found that this object is achieved by the naphthalocyanines of the above-defined formula I as pigments having isometric particles and a particle size distribution from 10 to 300 nm.

We have also found a process for preparing these naphthalocyanines by a) dry grinding the as-synthesized crude product and if desired b) then treating the ground product at elevated temperature with a liquid consisting essentially of water and an organic solvent.

We have additionally found a process for preparing the naphthalocyanines by c) wet grinding the as-synthesized crude product in a liquid consisting essentially of water and an organic solvent, with or without d) a subsequent heat treatment of the as-ground suspension.

We have also found that the naphthalocyanines are useful for pigmenting printing inks, paints and plastics.

Not least we have found printing inks which contain the naphthalocyanines as pigments together with a polar binder system.

Preferred embodiments of the invention are revealed in the subclaims.

Suitable radicals $R^1$ to $R^8$ are hydrogen and in particular hydroxyl. Also suitable are $C_1$-$C_{20}$-alkyl and $C_1$-$C_{20}$-alkoxy groups, whose carbons may in each case be interrupted by from 1 to 4 oxygen atoms in ether function. Preference is given to $C_1$-$C_4$-alkyl groups and alkoxy groups with particular preference being given to $C_1$-$C_{10}$-alkoxy groups.

Examples of suitable alkyl radicals $R^1$ to $R^8$ are: methyl, ethyl, propyl, isopropyl, butyl, isobutyl, secbutyl, tert-butyl, pentyl, isopentyl, neopentyl, tertpentyl, hexyl, 2-methylpentyl, heptyl, octyl, 2-ethylhexyl, isooctyl, nonyl, isononyl, decyl, isodecyl, undecyl, dodecyl, tridecyl, 3,5,5,7-tetramethylnonyl, isotridecyl (the above designations isooctyl, isononyl, isodecyl and isotridecyl are trivial names derived from the oxo process alcohols - cf. Ullmanns Encyklopädie der technischen Chemie, 4th edition, Volume 7, pages 215 to 217, and Volume 11, pages 435 and 436), tetradecyl, pentadecyl, hexadecyl, heptadecyl, octadecyl, nonadecyl, eicosyl, 2-methoxyethyl, 2-ethoxyethyl, 2-propoxyethyl, 2-isopropoxyethyl, 2-butoxyethyl, 2- and 3-methoxypropyl, 2- and 3-ethoxypropyl, 2- and 3-propoxypropyl, 2- and 3-butoxypropyl, 2- and 4-methoxybutyl, 2- and 4-ethoxybutyl, 2- and 4-propoxybutyl, 2- and 4-butoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 4,8-dioxadecyl, 3,6,8-trioxadecyl, 3,6,9-trioxaundecyl, 3,6,9,12-tetraoxatridecyl and 3,6,9,12-tetraoxatetradecyl.

Suitable alkoxy radicals $R^1$ to $R^8$ are for example: methoxy, ethoxy, propoxy, isopropoxy, butoxy, isobutoxy, pentyloxy, hexyloxy, heptyloxy, octyloxy, 2-ethylhexyloxy, isooctyloxy, nonyloxy, isononyloxy, decyloxy, isodecyloxy, undecyloxy, dodecyloxy, tridecyloxy, isotridecyloxy, tetradecyloxy, pentadecyloxy, hexadecyloxy, heptadecyloxy, octadecyloxy, nonadecyloxy, eicosyloxy, 2-methoxyethoxy, 2-ethoxyethoxy, 2-propoxyethoxy, 2-isopropoxyethoxy, 2-butoxyethoxy, 2- and 3-methoxypropoxy, 2- and 3-ethoxypropoxy, 2- and 3-propoxypropoxy, 2- and 3-butoxypropoxy, 2- and 4-methoxybutoxy, 2- and 4-ethoxybutoxy, 2- and 4-propoxybutoxy, 2- and 4-butoxybutoxy, 3,6-dioxaheptyloxy, 3,6-dioxaoctyloxy, 4,8-dioxanonyloxy, 3,7-dioxaoctyloxy, 3,7-dioxanonyloxy, 4,7-dioxaoctyloxy, 4,7-dioxanonyloxy, 4,8-dioxadecyloxy, 3,6,8-trioxadecyloxy, 3,6,9-trioxaundecyloxy, 3,6,9,12-tetraoxatridecyloxy and 3,6,9,12-tetraoxatetradecyloxy.

Examples of phenyl-substituted alkyl and alkoxy groups are benzyl, 1- and 2-phenylethyl, benzyloxy and 1- and 2-phenylethoxy.

Radicals $R^1$ to $R^8$ can be identical or different. Preferably at least one of them is not hydrogen. Particularly preferably they are identical alkyl and in particular alkoxy radicals.

Suitable radicals $R^9$ to $R^{12}$ are likewise the above-recited $C_1$-$C_{20}$-alkyl and -alkoxy groups, which may be interrupted by oxygen atoms in ether function, and the preferred meanings are the same too. Also suitable are halogen such as fluorine, chlorine and bromine and in particular hydrogen.

Suitable central atoms Me are in addition to hydrogen uni- and bivalent metal atoms which may carry further substituents for valence saturation.

Preferred metal atoms include for example lithium, copper, magnesium, zinc, nickel, tin, manganese, indium, vanadium, titanium and aluminum, of which the more than bivalent, generally trivalent or tetravalent, metal atoms carry further substituents, such as halogen, in particular chlorine, bromine and iodine, hydroxyl, oxygen, alkoxy, alkylamino, alkylthio and alkanoyloxy, whose alkyl chains customarily have from 1 to 10 carbon atoms and may be interrupted by oxygen atoms in ether function. Suitable examples here are TiO, VO and AlCl.

Particularly preferred central atoms Me are copper and in particular two hydrogen atoms; that is, the metal-free naphthalocyanine pigments I are particularly preferable.

The naphthalocyanines I according to the invention have an isometric particle shape and generally have particle sizes from 10 to 300 nm, preferably from 20 to 100 nm.

The naphthalocyanines I are obtainable with advantage by the process of the invention by finishing the as-synthesized products, which are in the form of nonuniformly shaped particles having sizes up to 5 μm, tend to agglomerate and cannot be used as pigments. The synthesis may have been carried out as described in the earlier German Patent Application P 43 10 371.5 or GB-B- 2 168 372 by etherification of 1,4-dihydroxy-2,3-dicyanonaphthalenes, formation of the metal-free naphthalocyanines and, if desired, subsequent metallization.

In the finishing process of the invention, the crude products are subjected to an activating grinding (step a)) and preferably to a subsequent conditioning heat treatment in a mixture of water and an organic solvent (step b)) (variant 1) or advantageously (variant 2) directly to a wet grinding (step c)) in the presence of a liquid phase consisting essentially of water and an organic solvent with or without a subsequent heat treatment of the as-ground suspension (step d)).

This form of pigment finishing is known per se and has been described for example for copper phthalocyanine and chlorinated copper phthalocyanines in U.S. Pat. No. 2,857,400 and DE-A-1 619 568, but it was unforeseeable that it can also be used with success in the case of the naphthalocyanines of the invention, which are substituted by solubility-enhancing groups and crystallize in a different form than the insoluble phthalocyanine pigments.

The dry grinding (step a) of variant 1) is advantageously carried out in a ball mill. Suitable grinding media include for example steel balls, porcelain balls, balls made of silicon/aluminum/zirconium oxide, which in general are from 2 to 5 cm in diameter. For smaller batches it is also possible to use steel laboratory vibrating mills or porcelain mills on roll boards. It is advantageous to fill the mill with the pigment and grinding media to a fill level from ¼ to ½, preferably about ⅓.

The grinding time is generally from 1 to 15 h. The grinding speed (revolutions per minute) is advantageously from 60 to 70% of the critical speed.

Generally, dry grinding is sufficient to produce naphthalocyanines of very good pigmentary quality with particle sizes of from 10 to 40 nm. A further increase in the pigmentary quality can be achieved by an additional, conditioning step (step b)), which produces isometric, usually cuboid, particles having a narrow particle size distribution from about 40 to 120 nm. Depending on the intended use, either the merely ground or the additionally conditioned products are preferable.

The conditioning (step b) of variant 2) is customarily carried out by heating the ground product with stirring at from 50° C. to the reflux temperature in a mixture of water and an organic solvent. This treatment generally takes from 0.5 to 3 h. The end product can subsequently, after cooling and addition of water, be isolated by filtration, and dried.

Suitable organic solvents are in particular aliphatic alcohols, such as $C_3$-$C_{12}$-alcohols, particularly $C_3$-$C_8$-alkanols such as ethanol, propanol, isopropanol, 2-ethylhexanol and especially butanol and isobutanol, aliphatic ether alcohols, particularly $C_2$-$C_3$-alkylene glycol mono-$C_2$-$C_4$-alkyl ethers such as ethylene glycol monoethyl, monopropyl and especially monobutyl ethers and methyldiglycol (diethylene glycol monomethyl ether), but also propylene glycol monomethyl ether and also tetrahydrofuran. Of course, it is also possible to use solvent mixtures.

The weight ratio of water to organic solvent is variable within wide limits, usually it is from about 10:1 to 1:1, preferably from 2.5:1 to 1.5:1.

Per g of naphthalocyanine to be treated the amount of liquid phase used is generally from 2 to 10, preferably from 3 to 5, g.

The conditioning mixture may include further customary additives such as surfactants, resins, in particular rosin and derivatives thereof, and also the reaction products with maleic or fumaric anhydride and alkyd resins, and also acids or alkalis.

The temperature in step b) is determined by the choice of solvent mixture. It is usually from 50° to 100° C.

Depending on the particular pigment it may also be possible to dispense with the conditioning step b). This is the case in particular when the solvent system used in the printing ink brings about a recrystallization of the pigment and the conditioning takes place automatically in the course of making the printing ink.

The naphthalocyanines I can also be obtained with advantage by variant 2 of the production process of the invention, where a wet grinding operation (step c)) is carried out directly and may be followed by a conditioning step (step d)).

The wet grinding (step c)) takes place in the presence of a liquid phase consisting essentially of water and an organic solvent.

Suitable organic solvents here are the solvents already mentioned for the conditioning step b), particular preference being given to ethylene glycol monobutyl ether.

The weight ratio of water to organic solvent is here too variable within wide limits, usually it is from about 40:1 to 2:1, preferably from 20:1 to 5:1.

Per g of naphthalocyanine to be ground the amount of liquid phase used is generally from 4 to 25, preferably from 6 to 10, g.

The wet grinding is advantageously carried out in a stirred ball mill. Suitable grinding media include for example balls of silicon/aluminum/zirconium oxide, which generally have diameters from 0.2 to 0.6 mm, preferably from 0.3 to 0.4 mm.

The grinding time is generally from 0.5 to 0.8 h, preferably from 1.5 to 3 h, given a mill base throughput of usually from 200 to 600 kg/h, particularly from 300 to 500 kg/h. Favorable specific energy inputs generally range from 1 to 8, preferably 1.5 to 3, kWh/kg of dry pigment.

The wet grinding can be carried out not only at room temperature (with external cooling) but also at elevated temperature. Suitable temperatures are generally from 20° to 90° C., preferably from 30° to 70° C.

Especially at low grinding temperatures it can be of advantage to add a conditioning step d) in which the as-ground suspension is subjected to a heat treatment (from about 50° C. to the reflux temperature, for in general from 0.5 to 3 h) in order that, if desired, the pigment particle size may be increased in this way.

Pigments having particle sizes from about 40 to 100 nm, is relatively coarsely divided products, however, can also be produced directly by grinding at higher temperature.

The temperature at which the grinding is carried out thus provides a simple way of controlling the pigment particle size.

The naphthalocyanines of the invention are, because of their favorable particle geometry, usable in pigmentary form for many applications and have excellent application properties. They combine a strong, narrowband absorption in the IR region from about 750 to 950 nm with good transparency in the visible region and exhibit excellent fastness properties, including in particular lightfastness and migration fastness properties.

The naphthalocyanines I are very highly suitable for preparing printing inks, for example for flexographic printing, intaglio printing and in particular for ink-jet processes, and paints and also for pigmenting plastics (eg. PMMA).

Suitable for preparing printing inks are in particular polar binder systems, for example mixtures of polyacrylate, water and isopropanol, but also mixtures of nitrocellulose, ethanol and ethyl acetate, and mixtures of polyamide resins and alcohols (Eurelon®, Schering).

Ink-jet inks can be prepared using the naphthalocyanines I as aqueous or alcoholic dispersions, as described for example in DE-A-41 15 608.

EXAMPLES

Octabutoxynaphthalocyanine (pigment A) and copper octabutoxynaphthalocyanine (pigment B)

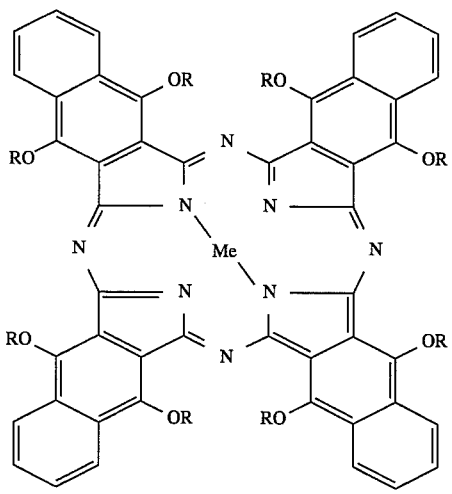

A: $R = n\text{-}C_4H_9$
   $Me = 2H$
B: $R = n\text{-}C_4H_9$
   $Me = Cu$ were converted by the process of the invention into a form suitable for use as a pigment. The crude materials used were the naphthalocyanines prepared as described respectively in Examples 8 and 11 of earlier German patent application P 43 10 371.5, which have a nonuniform particle shape and particle sizes up to about 5 μm.

For this they were subjected to dry grinding (step a)) and in part also to conditioning (step b)) according to variant 1 or to wet grinding (step c)) and in part to a subsequent conditioning (step d)) according to variant 2.

Variant 1:

a) Activating grinding:
100 g of pigment were in each case ground for 10 h in a porcelain mill on a roll board (capacity 5 l) by means of 3 kg of steel balls (diameter 3 cm).

b) Conditioning:
100 g of the ground pigment obtained in step a) were stirred at reflux in a mixture of 200 ml of water and 90 ml of isobutanol for $t_1$ h. After cooling and addition of 2000 ml of water the pigment was filtered and dried in a through circulation cabinet at 70° C.

Variant 2:

c) Wet grinding:
A mixture of 4.5 kg of pigment, 4.5 kg of ethylene glycol monobutyl ether and 31.5 kg of water was ground after precomminution in a rotor mill in a stirred ball mill (Netzsch ZWM 23; sieve 100 μm, grinding media of silicon/aluminum/zirconium oxide from 0.3 to 0.4 mm in diameter) at T° C. for 2 h using a throughput of 480 kg/h and a specific energy input of 2 kWh/kg of pigment. The pigment was, if necessary after cooling down, filtered off, washed with water and dried in a through-circulation cabinet at 70° C. or directly in the as-obtained suspension subjected to a conditioning treatment.

d) Conditioning:
The suspension obtained in step c) was refluxed in a kettle for $t_2$ h. After cooling down the pigment was isolated as described under c).

Further details of these experiments are given in Tables 1 and 2.

To determine the absorption maxima, the treated pigments and, for comparison, the crude materials too (CA and CB) were each ground up in 12% strength by weight in a Skandex mixer for 30 to 120 min (depending on pigment and binder) in the following binder solutions:

1. Uncrosslinked polyacrylate (Joncryl® 679; Johnson)/water/isopropanol/concentrated ammonia (weight ratio 25:50:20:6)=PWI
2. Nitrocellulose (nitrocellulose A 400, nitrogen content 10.9–11.3%, low viscosity; Wolff, Waistode)/ethanol/ethyl acetate (weight ratio 17.5:62.5:20)=NEE The 12% strength concentrates were diluted to 2% with the respective binder solution and applied to acetate film using a 12 μm doctor. The solvents evaporated to leave layers from 2 to 3 μm in thickness.

Furthermore, the pigments obtained were used to prepare an offset printing ink by dispersing them at 15% strength by weight in an offset varnish based on mineral oil (oxidatively drying, no solvent; =OFS) by 3 passes through a three-roll mill (10 bar).

The 15% strength pastes were then diluted with further binder to 0.3% and applied to acetate film using a 50 μm doctor.

The absorption spectra of these samples were measured in transmitted light. The results of these measurements are given in Tables 1 and 2.

TABLE 1

| Ex. | Pigment | Conditioning $t_1$ h | Particle sizes [nm] | Binder | Absorption maxima: $\lambda_{max}$ [nm]/absorbance |
|---|---|---|---|---|---|
| 1 | A | — | 10–20[1] 40–120[2] | PWI | 891/1.20; 795/0.48; 480/0.33 |
| 2 | A | 2 | 40–120 | PWI | 925/1.21; 890/1.31; 795/0.57; 480/0.36 |
| 3 | CA | — | 20–2000 | PWI | 919/0.69; 898/0.69; 793/0.37; 481/0.31 |
| 4 | A | — | 10–20[1] 40–120[2] | NEE | 940/1.10; 795/0.42; 483/0.44 |
| 5 | A | 2 | 40–120 | NEE | 938/1.07; 794/0.46; 483/0.37 |
| 6 | CA | — | 20–2000 | NEE | 947/0.55; 796/0.30; 490/0.29 |
| 7 | B | — | 20–40 | PWI | 879/1.62; 786/0.59; 495/0.33 |
| 8 | B | 0.5 | 30–80 | PWI | 875/1.31; 785/0.55; 495/0.31 |
| 9 | CB | — | 40–500 | PWI | 887/0.65; 785/0.29; 497/0.28 |
| 10 | B | — | 20–40 | NEE | 924/1.18; 785/0.57; 498/0.46 |
| 11 | B | 0.5 | 30–80 | NEE | 921/1.12; 785/0.53; 498/0.41 |
| 12 | CB | — | 40–500 | NEE | 919/0.38; 786/0.26; 502/0.27 |

[1] as powder before incorporation in printing ink
[2] in the printing ink after incorporation

TABLE 2

| Ex. | Pigment | Grinding temperature T [°C.] | Conditioning $t_2$ h | Particle sizes [nm] | Binder | Absorption maxima: $\lambda_{max}$ [nm]/absorbance |
|---|---|---|---|---|---|---|
| 13 | B | 35 | — | 20–60 | PWI | 880/1.30; 788/0.53; 479/0.28 |
| 14 | B | 35 | 3 | 40–100 | PWI | 911/1.01; 889/1.02; 787/0.48; 481/0.30 |
| 15 | B | 70 | — | 40–100 | PWI | 917/1.08; 787/0.50; 481/0.31 |
| 16 | B | 35 | — | 20–60 | NEE | 909/1.11; 785/0.51; 482/0.31 |
| 17 | B | 33 | 3 | 40–100 | NEE | 912/1.15; 785/0.53; 481/0.33 |
| 18 | B | 70 | — | 40–100 | NEE | 918/1.17; 785/0.56; 481/0.36 |
| 19 | B | 35 | — | 20–60 | OFS | 858/1.08; 801/0.31; 478/0.16 |
| 20 | B | 35 | 3 | 40–100 | OFS | 859/0.83; 807/0.26; 478/0.15 |
| 21 | B | 70 | — | 40–100 | OFS | 873/1.07; 792/0.36; 479/0.20 |

We claim:

1. A naphthalocyanine compound of formula I

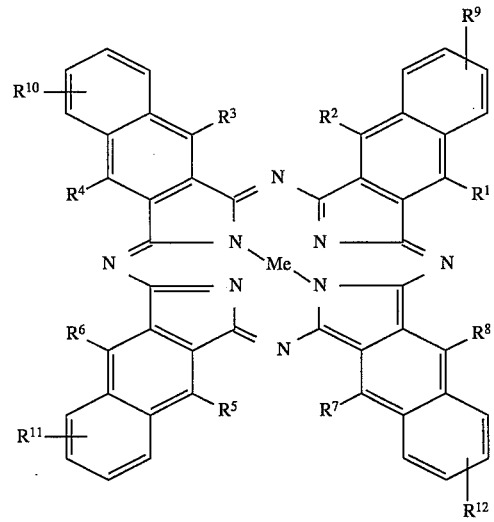

where the variables have the following meanings:

$R^1, R^2, R^3, R^4, R^5, R^6, R^7$ and $R^8$ are each independently of the others, hydrogen, hydroxyl, $C_1$-$C_{20}$-alkyl or $C_1$-$C_{20}$-alkoxy, whose carbon chains may each be interrupted by from 1 to 4 oxygen atoms in ether function and which may be phenylsubstituted, $R^9, R^{10}, R^{11}$ and $R^{12}$ are each independently of the others, hydrogen, halogen or $C_1$-$C_{20}$-alkyl or $C_1$-$C_{20}$-alkoxy, whose carbon chains may be interrupted by from 1 to 4 oxygen atoms in ether function, wherein at least two of $R_1$-$R_{12}$ are solubilizing groups, Me is two hydrogen atoms, two univalent metal atoms or a bivalent metal atom with or without further substituents for valence saturation, wherein said naphthalocyanine compound is in the form of isometric particles having a particle size distribution from 10 to 300 nm.

2. A naphthalocyanine compound of formula I as claimed in claim 1 where the variables have the following meanings:

$R^1, R^2, R^3, R^4, R^5, R^6, R^7$ and $R^8$ are each independently of the others, hydrogen, hydroxyl, $C_1$-$C_4$-alkyl or $C_1$-$C_{20}$-alkoxy, $R^9, R^{10}, R^{11}$ and $R^{12}$ are each hydrogen, Me is two hydrogen atoms, two lithium atoms, magnesium, zinc, copper, nickel, VO, TiO or AlCl.

3. Naphthalocyanines of the general formula I as claimed in claim 1 where the variables have the following meanings:

$R^1, R^2, R^3, R^4, R^5, R^6, R^7$ and $R^8$ are each independently the others, hydroxyl or $C_1$-$C_{20}$-alkoxy, $R^9, R^{10}, R^{11}$ and $R^{12}$ are each hydrogen, Me is two hydrogen atoms, two lithium atoms, magnesium, zinc, copper, nickel, VO, TiO or AlCl.

4. A naphthalocyanine compound of formula I as claimed in claim 1 where the variables have the following meanings:

$R^1, R^2, R^3, R^4, R^5, R^6, R^7$ and $R^8$ are each in the others $C_1$-$C_{10}$-alkoxy, $R^9, R^{10}, R^{11}$ and $R^{12}$ are each hydrogen, Me is two hydrogen atoms or copper.

5. A naphthalocyanine compound as claimed in claim 1, made by a) dry grinding an as-synthesized crude product naphthalocyanine compound of formula 1 and if desired b) then treating the ground product at elevated temperature with a liquid consisting essentially of water and an organic solvent or c) wet grinding the as-synthesized crude product in a liquid consisting essentially of water and an organic solvent, with or without d) a subsequent heat treatment of the suspension obtained in c);

wherein the organic solvent used in step b) or c) is a $C_{12}$-alcohol, a $C_2$-$C_3$ alkylene glycol mono-$C_2$-$C_4$-alkyl ether or tetrahydrofuran.

6. A printing ink comprising one or more of the naphthalocyanine compounds as set forth in claim 1 and a polar binder system.

7. A process for preparing the naphthalocyanine compounds as claimed in claim 1, comprising treating an as-synthesized crude product naphthalocyanine compound of Formula I by dry grinding and, optionally, treating the ground product at elevated temperature with a liquid consisting essentially of water and an organic solvent.

8. A process for preparing a naphthalocyanine compound as claimed in claim 1, comprising wet grinding an as-synthesizing crude product naphthalocyanine compound of Formula I in a liquid consisting essentially of water and an organic solvent, with or without subsequent heat treatment of the suspension obtained in the wet grinding step.

9. The process as claimed in claim 7 wherein said organic solvent is a $C_3$-$C_{12}$-alcohol, a $C_2$-$C_3$-alkylene glycol mono-$C_2$-$C_4$-alkyl ether or tetrahydrofuran.

10. The process as claimed in claim 8 wherein said organic solvent is $C_3$-$C_{12}$-alcohol, a $C_2$-$C_3$-alkylene glycol mono-$C_2$-$C_4$-alkyl ether or tetrahydrofuran.

* * * * *